No. 735,235. PATENTED AUG. 4, 1903.
W. W. FOUST.
FISHING CORK.
APPLICATION FILED MAY 18, 1903.
NO MODEL.
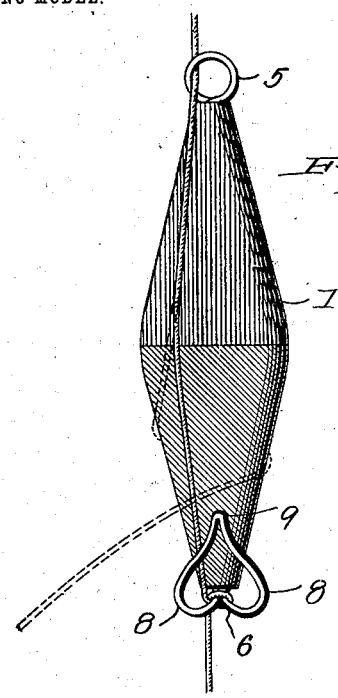
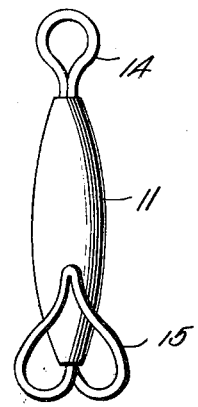
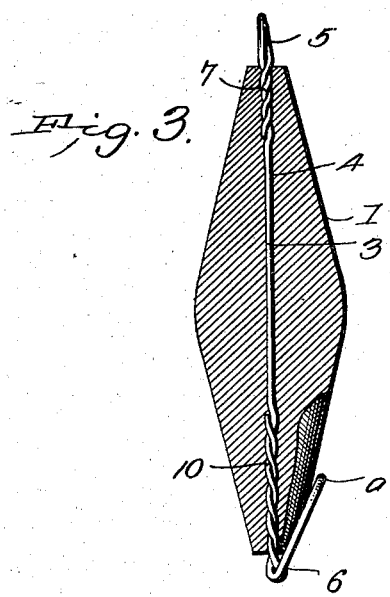
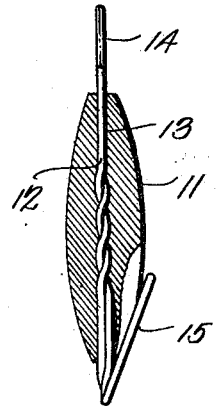
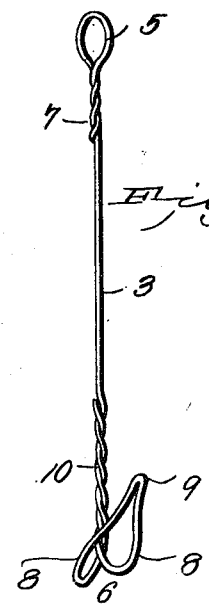
Witnesses
William W. Foust, Inventor.
by C. A. Snow & Co.
Attorneys No. 735,235. Patented August 4, 1903.

UNITED STATES PATENT OFFICE.

WILLIAM WARNOCK FOUST, OF BARNEGAT, NEW JERSEY.

FISHING-CORK.

SPECIFICATION forming part of Letters Patent No. 735,235, dated August 4, 1903.

Application filed May 18, 1903. Serial No. 157,672. (No model.)

*To all whom it may concern:*

Be it known that I, WILLIAM WARNOCK FOUST, a citizen of the United States, residing at Barnegat, in the county of Ocean and State of New Jersey, have invented a new and useful Improvement in Fishing-Corks, of which the following is a specification.

My invention relates to devices for attaching floats or sinkers to fishing-lines, and has for its objects to produce a device of this character which will be simple of construction, efficient in operation, and one in which the member will be securely held in any desired position, and may be readily released for adjustment, upon the line.

With these and other objects in view the invention comprises the novel details of construction and combination of parts more fully hereinafter described.

In the accompanying drawings, Figure 1 is a perspective view of a float having my device applied thereto and showing the same in position upon the line. Fig. 2 is a similar view of a sinker provided with my improved device. Fig. 3 is a longitudinal sectional elevation centrally through Fig. 1. Fig. 4 is a similar view taken centrally through Fig. 2. Fig. 5 is a detail perspective view of my improved device.

Referring to the drawings and particularly to Figs. 1, 3, and 5, 1 indicates a float or similar member of any suitable or desired construction and material having my improved line-attaching device applied thereto.

My improved device is composed, preferably, of copper wire and comprises a body portion 3, which extends through a central longitudinal opening 4 of the float, a line-receiving member 5, and a line-securing member 6. The line-receiving member is preferably in the form of a ring or eye formed at the upper end of the body portion by bending the wire thereof into shape and wrapping its terminal around the body portion 3, as at 7, while the line-securing member 6 is preferably in the form of a hook having laterally-extended side portions or enlargements 8 and a terminal lip or finger 9, said member being formed by bending the lower end of the body portion into shape and wrapping its terminal around the body portion, as at 10. When the device is in position applied to a float, the finger 9 of the attaching member overlies the lower end of the float or member and contacts or practically contacts therewith, the member being sufficiently resilient or yieldable to permit the line to be passed between said finger and the adjacent face of the float.

In applying to a line a float equipped with my improved device the line is first passed through the upper receiving ring or member 5 and then given a loop or half-turn, as indicated by dotted lines in Fig. 1, around the body of the float and finally drawn downward beneath the finger 9, which tightens the loop around the member 6, between the same and the end of the float, the member, owing to its peculiar form, serving to prevent escape of the line, thus maintaining the float securely in position and preventing movement of the same longitudinally of the line. To adjust the float longitudinally of the line necessitates simply loosening of the loop and removal of the line from beneath the attaching member, which operation may be very quickly performed.

In Figs. 2 and 4 I have illustrated my improved device as applied to a sinker 11, the device consisting of a body portion 12, extending through a central longitudinal opening 13 of the sinker, a line-receiving member 14, and an attaching member 15, all constructed and operating in a manner identical with that above described.

From the foregoing it will be seen that I produce a device which is extremely simple of construction and operation and one which permits of the member to which it is applied being quickly and securely fastened to the line or readily released for adjustment thereon. In attaining these ends it is to be understood that I do not limit myself to the precise details of construction herein shown and described, inasmuch as minor changes may be made therein without departing from the spirit of my invention.

Having thus described my invention, what I claim is—

1. A device of the class described comprising a body provided at one end with a line-receiving member and at its other end with a line-attaching member consisting of a hook having laterally-extending side portions and disposed with its receiving end overlying the body.

2. In a device of the class described, the combination with a body, provided with a longitudinal opening, of a line-attaching device associated with the body and comprising a body portion extending through the opening and provided at one end with a line-receiving member and at its opposite end with a line-attaching member, the latter consisting of a hook having laterally-extended side portions and disposed with its receiving end overlying the body.

3. In a device of the class described, the combination with a body having a longitudinal opening, of a line-attaching device associated with the body, and comprising a body portion extending through the opening, a line-receiving ring formed at one end of the body portion and a line-attaching hook formed at its other end, said hook having laterally-extended side portions and being disposed with its receiving end overlying the body.

4. In a device of the class described, the combination with a body having a longitudinal opening, of a line-attaching device associated with the body and comprising a length of wire extended through the opening and having one of its ends bent to form a line-receiving ring and its other end bent to form a line-attaching hook having laterally-extended side portions, the terminals of the wire being wrapped upon its body portion and the receiving end of the hook being disposed over said body.

In testimony that I claim the foregoing as my own I have hereto affixed my signature in the presence of two witnesses.

WILLIAM WARNOCK FOUST.

Witnesses:
AMOS B. NEWBURY,
JOHN P. LILLSBRIDGE.